United States Patent Office 2,957,916
Patented Oct. 25, 1960

2,957,916

PROCESS OF PREPARING 1-NITRO PHENYL-2-AMINO-PROPANE-DIOLS-(1,3) OF THE THREO-SERIES AND THEIR N-ACYLATED DERIVATIVES

Erich Haack, Heidelberg, Hermann Dimroth, Ziegelhausen (Neckar), Adolf Hagedorn, Mannheim-Waldhof, Werner Heimberger, Ludwigshafen (Rhine), and Wilhelm Peschke, Mannheim, Germany, assignors to C. F. Boehringer & Soehne G.m.b.H., Mannheim-Waldhof, Germany, a corporation of Germany No Drawing. Filed Oct. 1, 1957, Ser. No. 687,345

Claims priority, application Germany Aug. 22, 1952

3 Claims. (Cl. 260—562)

This invention relates to an improved process of preparing derivatives of 1-phenyl-2-amino propanediol-1,3 compounds and more particularly to an improved process of preparing derivatives of 1-phenyl-2-amino propanediol-1,3 compounds of the threo-series substituted in the aromatic nucleus by a nitro group, and of their N-acylated derivatives.

The present application is a continuation-in-part of our copending application Serial No. 375,050, filed August 18, 1953, and entitled "Process of Preparing Nucleus Nitrated 2-Amino Alkandiols-1,3) of the Threo-Series and Their N-Acylated Derivatives," now abandoned.

It is known to convert aromatic amino alcohols into derivatives which are substituted in the aromatic nucleus by a nitro group. When using 1-aryl-2-amino alkanes as starting materials in this nitration reaction, the corresponding p-nitro compounds were obtained. Heretofore, attempts to use this method for the nitration of 1-aryl-2-amino alkanediols-1,3 were unsuccessful. For instance, on nitrating 1-phenyl-2-amino propanediol-1,3 or its N-dichloro acetyl derivative, resinous, non-crystallizing gums were obtained of which none of the predicted p-nitro amino diols could be isolated (see "Journal of the American Chemical Society," volume 71, 1949, page 2463).

To overcome this difficulty it has been suggested to use, as starting materials, the triacyl derivatives instead of the free amino diols and to subject said triacyl derivatives to the action of nitrating agents. This reaction yields comparatively satisfactory results; however, it requires first the preparation of the triacyl derivatives which subsequently, after nitration, must be hydrolyzed to yield the corresponding nitrated amino diols. These additional steps of acylation and subsequent hydrolysis, of course, result in considerable losses and, furthermore, increase the costs of production of the desired nitrated amino diol compounds.

A process is known whereby 1-phenyl-2-acetamido propanediol-1,3 is nitrated with fuming nitric acid at 30–35° C. The resulting nitration product is heated with hydrochloric acid whereby the acetyl group is split off. The resulting hydrolyzed solution is then evaporated to a small volume, its pH is adjusted to a pH value of 11.0 by the addition of sodium hydroxide and the nitration product is extracted from the alkaline solution by means of ethyl acetate. It is claimed that, thereby, 1-(p-nitro phenyl)-2-amino propanediol-1,3 is obtained in a yield of about 20% of the starting material.

The valuable antibiotic choramphenicol, i.e. D(-)-threo-1-(p-nitro phenyl)-2-dichloro acetamido propanediol-1,3, is the most important compound obtainable according to these known processes. Many attempts have been made to improve the process of preparing this compound and to increase its yield as is evident from the many publications and patents disclosing numerous modifications of its manufacturing process.

It is one object of the present invention to provide an improved, simple and effective process of preparing chloramphenicol and similar 1-phenyl-2-amino propanediol-1,3 compounds of the threo-series which are substituted in the aromatic nucleus by a nitro group. The new process does not require triacylated derivatives of the starting material but uses the free amino propane diol compounds or their N-acylated derivatives as starting materials.

Other objects of this invention and advantageous features thereof will become apparent as the description proceeds.

In principle, the process according to the present invention employs a starting material which is obtained by subjecting 1-phenyl-2-amino propanediol-1,3 or its N-acyl derivatives to the action of nitrating agents. Thereby a nitro group is introduced not only into the aromatic nucleus but thereby also the alcoholic hydroxyl groups are completely esterified, thus, yielding the corresponding di-nitric acid esters of said amino propanediols.

The resulting di-nitric acid esters of 1-phenyl-2-amino propanediol-1,3 of the threo series or their N-acyl derivatives are subjected, according to the present invention, to the action of especially suitable hydrolyzing agents which cause hydrolysis of the nitric acid ester groups. The reaction products are isolated from the hydrolyzed reaction mixture by precipitation, extraction, or other suitable methods. In some cases it is of advantage to isolate the resulting nitro compounds in the form of their difficulty water soluble condensation products with aldehydes.

In preparing the starting materials for the present invention nitration may be effected not only with a mixture of concentrated nitric acid and concentrated sulfuric acid but also with fuming or concentrated nitric acid, preferably in the presence of an inert organic solvent, such as chloroform, ether, and the like. The nitration temperature may vary considerably, for instance, between −40° C. and +25° C. The preferred temperatures are temperatures below 0° C.

In the place of the free amino propane diols, one may use, for nitration, derivatives thereof which are readily split up to such amino propane diols by the nitrating agents used. Such derivatives are, for instance, their acetals, ketals, oxazolidines, Schiff's bases and the like.

Especially suitable starting materials are the reaction products of 1-phenyl-2-amino propanediols of the threo-series or their N-acyl derivatives with aldehydes or ketones, i.e. 6-phenyl-5-amino-1,3-dioxane compounds and their N-acyl derivatives. These dioxane compounds are obtained according to the copending patent application Serial No. 285,312 of Onno Onnen, Wilhelm Peschke, and Erich Rabald, entitled Substituted 1,3-Dioxane Compounds, and a Process of Making Same, filed April 30, 1952, now abandoned.

Thus, the starting materials used according to the present invention correspond to the formula

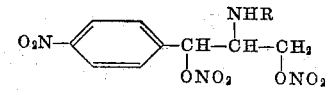

wherein R is hydrogen or an acyl radical and more particularly an acyl radical of a lower alkanoic acid, such as acetic acid, propionic acid, butyric acid, valeric acid, or of a halogen substituted lower alkanoic acid, especially of dichloro acetic acid.

It is very surprising that di-nitric acid esters of 1-(p-nitro phenyl)-2-amino propanediol-1,3 compounds of the threo-series and their N-acyl derivatives can be hydrolyzed to 1-(p-nitro phenyl)-2-amino propanediol-1,3 or its N-acyl derivatives; for, it is not possible to hydrolyze nitric acid esters of the corresponding amino mono-alcohols of the threo-series. Such mono-alcohols of the threo-series, for instance, pseudo-ephedrine, differ in this respect essentially from the corresponding mono-alcohols of the erythro-series, such as ephedrine. Their nitric acid esters do not yield, on hydrolysis of the nitration mixture, the free bases but neutral compounds of not yet sufficiently defined structure. That the corresponding di-nitric acid esters of 1-(p-nitro phenyl)-2-amino propanediol-1,3 can be hydrolyzed to the free nitro bases could not be foreseen nor expected.

As hydrolyzing agents there are used, according to the present invention, nitrite-destroying agents and more particularly urea, sulfamic acid, or ferrous salts. Hydrolysis by means of urea or sulfamic acid preferably is effected in aqueous sulfuric acid solution. When operating with ferrous salts, hydrolysis most advantageously is effected in aqueous alcoholic solution. These ferrous salts can be employed also with the addition of sulfamic acid or urea.

The use of ferrous salts as hydrolyzing agents has the advantage over the other hydrolyzing agents that an acyl-amino group present in the di-nitric acid ester is not hydrolyzed. It is, thus possible to directly produce chloramphenicol from D(-)-1-phenyl-2-dichloro acetamido propanediol-1,3 by nitration to the di-nitric acid ester of D(-)-1-(p-nitro phenyl)-2-dichloro acetamido propanediol-1,3 and hydrolysis according to the present invention by means of ferrous salts whereby only the nitric acid ester groups are hydrolyzed.

The following examples serve to illustrate the present invention without, however, limiting the same thereto.

*Example 1*

150 g. of the nitrate of DL-threo-1-phenyl-2-amino propanediol-1,3 obtained by reacting equimolecular amounts of nitric acid and DL-threo-2,2-dimethyl-5-amino-6-phenyl-1,3-dioxane in glacial acetic acid, are added in small portions at −10° C. to a mixture of 225 cc. of concentrated sulfuric acid and 225 cc. of fuming nitric acid in the course of one hour, while stirring vigorously. Stirring is continued at 0° C. for 3 hours. The reaction mixture is then poured on 1500 g. of ice. The precipitated crystalline nitration product is filtered off by suction. Yield after drying: 210 g. After recrystallization from alcohol or water, 165 g. (75%) of a compound melting at 159° C. are obtained. Analysis of this compound proves that it is the nitrate of a p-nitro phenyl-2-amino propanediol-1,3-di-nitric acid ester.

Saponification of this compound is effected as follows: The di-nitric acid ester is heated, while stirring, to 90° C. for 3 hours in 1600 cc. of 20% sulfuric acid to which 85 g. of sulfamic acid are added. The solution is then rendered alkaline and thoroughly extracted with acetic acid ethyl ester. The resulting extract is dried and evaporated to dryness. DL-threo-1-(p-nitro phenyl)-2-amino propanediol-1,3 having a melting point of 142–144° C. is obtained in a very good yield.

The levorotatory threo-1-phenyl-2-amino propanediol-1,3 yields, on nitration and hydrolysis in an analogous manner, the corresponding levorotatory 1-p-nitro phenyl-2-amino propanediol-1,3 of the melting point 162° C.

*Example 2*

A solution of 20.7 g. (0.1 mol) DL-threo-2,2-dimethyl-5-amino-6-phenyl-1,3-dioxane in 25 cc. of chloroform is added at −30° C. to 60 cc. of fuming nitric acid in the course of half an hour, while stirring. Stirring is continued at −20° C. for three hours. The reaction mixture is then cooled to −40° C. and is poured on 100 g. of ice. After one hour the precipitate is filtered off by suction. The crystalline precipitate of the nitrate of DL-threo-1-(p-nitro phenyl)-2-amino propanediol-1,3 di-nitric acid ester is recrystallized from water and has a melting point of 158–159° C. Yield: 68.5%.

The recrystallized compound is hydrolyzed in the same manner as described in Example 1, thereby using 10 g. of sulfamic acid and 200 cc. of 20% sulfuric acid. The mixture is poured on ice. Sodium hydroxide solution is added until the pH value is reduced to a pH of 6.0, and 10 cc. of benzaldehyde are added to the mixture which is then stirred for one hour. During that period so much of N sodium hydroxide solution is added drop by drop that the pH always remains below 8.8. The precipitate is filtered off by suction and washed with water and ether. Melting point of the resulting benzaldehyde condensation product of DL-threo-(p-nitro phenyl)-2-amino propanediol-1,3: 158–159° C. Yield: 91.5%.

*Example 3*

62 g. of the nitrate of DL-threo-2,2-pentamethylene-5-amino-6-phenyl-1,3-dioxane are added in portions at −15° C. to a mixture of 93 cc. of 98% sulfuric acid and 62 cc. of 100% nitric acid in the course of 1½ hours, while stirring. Stirring is continued at +5° C. for 2 hours. The reaction mixture is worked up as described in Example 2 and yields 55.6 g. of the nitrate of DL-threo-1-(p-nitro phenyl)-2-amino propanediol-1,3 di-nitric acid ester. This ester is hydrolyzed and the hydrolyzed reaction mixture is worked up as described in Example 1. DL-threo-1-(p-nitro phenyl)-2-amino propanediol-1,3, melting at 142–144° C. is obtained.

*Example 4*

10 g. of DL-threo-2,2-dimethyl-5-acetylamino-6-phenyl-1,3-dioxane, obtained according to Example 8 of copending patent application Serial No. 285,312 of Onnon Onnen, Wilhelm Peschke, and Erich Rabald, entitled "Substituted 1,3-Dioxane Compounds, and a Process of Making Same," and filed April 30, 1952, are added in small portions at −5° C., while stirring and cooling, to a mixture of 15 cc. of concentrated sulfuric acid and 15 cc. of fuming nitric acid (d.:1.51). As soon as the compound is completely dissolved, the solution is allowed to stand for several hours at 0–3° C., while stirring.

The reaction mixture is then cooled to −15° C. and poured in 100 cc. of an aqueous 5% sulfamic acid solution. After standing for several hours, 100 cc. of 10% sulfuric acid and 5 g. of sulfamic acid are added thereto and the mixture is heated under reflux for 3 hours. After cooling, the mixture is neutralized with sodium hydroxide solution and 5 g. of benzaldehyde are added thereto at room temperature while stirring and adding, at the same time, drop by drop, an amount of dilute sodium hydroxide solution sufficient to keep the solution always at slightly alkaline reaction. After 1 hour the precipitated benzaldehyde condensation product of DL-threo-1-(p-nitro phenyl)-2-amino propanediol-1,3 is filtered off by suction and washed with water and ether. It is purified by recrystallization from methanol. Yield: 8.3 g. (about 70%) of the melting point 158–168° C.

When using as starting material equimolecular amounts of DL - threo - 2,2-dimethyl-5-propionylamido-6-phenyl-1,3-dioxane, DL-threo-2,2-dimethyl-5-n-butyroylamido-6-phenyl-1,3-dioxane, or DL-2,2-dimethyl-5-n-valerianyl-amido-6-phenyl-1,3-dioxane, in place of DL-threo-2,2-dimethyl-5-acetylamido-6-phenyl-1,3-dioxane and proceeding otherwise in the same manner as described hereinabove, the same benzaldehyde condensation product as described hereinabove is obtained.

*Example 5*

45 g. of L-threo-2,2-dimethyl-5-amino-6-phenyl-1,3-dioxane ($[\alpha]_D^{20}$: −44°) are dissolved in 220 cc. of ether. A mixture of 110 cc. of glacial acetic acid and 25.5 cc. of nitric acid (d.: 1.41) is added to said solution while cooling. After standing overnight, 41 g. of the nitrate of L-threo-1-phenyl-2-amino-propanediol-1,3, having a melting point of 172–173° C. precipitate.

40 g. of said nitrate are added, while stirring and cooling, at −10° C. to 120 cc. of a mixture of equal parts of concentrated sulfuric acid and fuming nitric acid in the course of 1¾ hours. Stirring is continued at 0° C. for four hours and the reaction solution is then poured into 400 cc. of ice-cold 5% sulfamic acid solution. To this mixture there are added 490 cc. of 20% sulfuric acid and 25 g. of sulfamic acid and the mixture is heated under reflux for 3 hours. After cooling, the resulting L-threo-1-(p-nitro phenyl)-2-amino propanediol-1,3 is isolated in the form of its difficultly water soluble condensation product with benzaldehyde by following the procedure described in Example 2. 35.3 g. of said condensation product are obtained which melt at 146–146° C.; $[\alpha]_D^{20}$: −93.16° (pyridine).

When allowing the nitration-solution to stand for some time after pouring into 400 cc. of 5% sulfamic acid solution, a precipitate of 49 g. of the nitrate of L-threo-1-(p-nitro phenyl)-2-amino-1,3-propanediol di-nitric acid ester of the melting point 144° C. is obtained.

This di-nitric acid ester is hydrolyzed in the same manner as described in the preceding examples and yields L-threo-1-(p-nitro phenyl)-2-amino propanediol of the melting point 157° C.

*Example 6*

A solution of 10 g. of DL-threo-1-phenyl-2-amino-propanediol-1,3 in 50 cc. of water is shaken with 6.6 g. of benzaldehyde at room temperature for about 1 hour. Thereby the condensation product precipitates in crystalline form. It is filtered off by suction, washed with water and ether, and dried. Yield: 14.7 g. of the melting point 148° C.

The resulting condensation product is added at −10° C. to 75 cc. of nitric acid (d.: 1.52) in the course of about 20 minutes. Stirring is continued at 0° C. for 3½ hours. The reaction solution is poured into 300 cc. of ice-water. A viscous mass precipitates which is intermingled with crystals. It is separated from the water and triturated with ether. The crystalline product obtained thereby is filtered off by suction. It is washed first with ether and then with water, and is dried. 12.3 g. of a compound melting at 155–156° C. are obtained. The compound is identical with the nitrate of DL-threo-1-(p-nitro phenyl)-2-amino propanediol-1,3-di-nitric acid ester obtained according to Examples 1, 2, and 3.

The crude product is saponified without further purification by boiling with 100 cc. of N sulfuric acid containing 5 g. of urea, for 3 hours. DL-threo-1-(p-nitro phenyl)-2-amino propanediol-1,3 is isolated from the saponification solution in the form of its condensation product with benzaldehyde as described in Example 4. Melting point, after recrystallization from methanol, 157–160° C.

*Example 7*

15 g. of DL-threo-2,6-diphenyl-5-amino-1,3-dioxane, obtained according to Example 5 of the above indicated copending patent application Serial No. 285,312, are added, while stirring and cooling, at −15° C. to a mixture of 20 cc. of concentrated sulfuric acid and 25 cc. of nitric acid (d.: 1.51) within about one hour. Stirring is continued for 3 hours while cooling with ice water. The resulting yellowish solution is poured into 250 g. of ice water and the mixture is allowed to stand for several hours at room temperature. The precipitated semi-solid mass is separated from the aqueous solution and triturated with ether. The resulting crystalline compound is filtered off by suction and is washed with ether and water. It is purified by recrystallization from hot water. 15.5 g. of the nitrate of DL-threo-1-(p-nitro phenyl)-2-amino propanediol-1,3-di-nitric acid ester, melting at 159° C. are obtained.

Said nitrate is saponified as described in Example 2 and the resulting DL-threo-1-(p-nitro phenyl)-2-amino propanediol-1,3 is isolated from the saponification reaction mixture by means of its condensation product with n-butyraldehyde which is difficultly soluble in water.

The saponified solution is neutralized by the addition of sodium hydroxide solution, 4 cc. of n-butyraldehyde are added thereto and the mixture is stirred at room temperature while maintaining weakly alkaline reaction by dropwise addition of dilute sodium hydroxide solution. Precipitation of the crystalline condensation product is completed after about 1 to 2 hours. It is filtered off by suction, washed with water, and dried. Yield: 92%. Melting point of the crude product: 104° C. After recrystallization from ether, the compound melts at 107 to 108° C.

*Example 8*

A mixture of 30 cc. of nitric acid (d.: 1.92) and 30 cc. of concentrated sulfuric acid is added while stirring and cooling, at −10° C. to a solution of 20 g. of DL-threo-1-phenyl-2-dichloro acetylamino propanediol-1,3 in 200 cc. of chloroform, in the course of 1½ hours. Stirring is continued for 30 minutes at −6° C. and for three hours at −2° C. The reaction mixture is then poured on ice to which 5 g. of sulfamic acid were added. The reaction product is extracted with acetic acid ethyl ester, the resulting extract is dried over sodium sulfate and evaporated to dryness. The residue is brought to crystallization by trituration with chloroform. The crude DL-threo-1-(p-nitro phenyl)-2-dichloro acetylamido propanediol-1,3-di-nitric acid ester, melting at 112° C. is obtained in a yield of about 75%. It can be purified by recrystallization from chloroform/benzene (1:1). The pure compound melts at 118° C.

*Example 9*

1 g. of D(-)-threo-1-(p-nitro phenyl)-2-dichloro acetylamino propanediol-1,3-di-nitric acid ester, obtained by nitrating levorotatory threo-1-phenyl-2-dichloro acetylamido propanediol-1,3 according to Example 8 is dissolved in 100 cc. of methanol. A solution of 8 g. of ferrous ammonium sulfate in 100 cc. of water is added thereto and the mixture is heated to boiling on the steam bath for 2½ hours. The methanol is evaporated and the residue is extracted with acetic acid ethyl ester. The extract is dried over sodium sulfate and is evaporated in a vacuum. 0.760 g. of D(-)threo-1-(p-nitro phenyl)-2-dichloro acetylamido propanediol-1,3 of the melting point 149° C. are obtained. Yield: 99%.

*Example 10*

5 g. of the nitrate of DL-threo-(p-nitro phenyl)-2-amino propanediol-1,3-di-nitric acid ester of the melting point 159° C., obtained according to Example 1, are suspended in 200 cc. of water. A solution of 30 g. of crystalline ferrous sulfate in 100 cc. of water is added thereto. The mixture is heated on the steam bath for one hour, while stirring, filtered, rendered alkaline, and thoroughly extracted with acetic acid ethyl ester. The extract is dried over potassium carbonate, and evaporated to dryness. The residue is recrystallized from water and yields DL-threo-1-(p-nitro phenyl)-2-amino propanediol-1,3 of the melting point 142–144° C. in almost quantitative yield.

Many changes and variations in the starting materials used, the nitrating and hydrolyzing agents employed, the conditions of nitration and hydrolysis, such as concentration of the reaction components, temperature, and duration, the methods of working up the reaction mixture, and of isolating and purifying the reaction products, and the like may be made by those skilled in the art in accordance with the principles set forth herein and in the claims annexed hereto.

We claim:
1. In a process of producing chloramphenicol, the step consisting in treating the methanolic solution of the di-nitric acid ester of D(-)-threo-1-(p-nitro phenyl)-2-dichloro acetylamido propanediol-1,3 with an aqueous solu- tion of ferrous sulfate, until hydrolysis of the nitric acid ester groups is substantially completed.

2. In a process of producing threo-1-(p-nitro phenyl)-2-dichloro acetamido propanediol-1,3, the steps consisting in adding an aqueous solution of ferrous ammonium sulfate to a methanolic solution of the di-nitric acid ester of said threo-1-(p-nitro phenyl)-2-dichloro acetamido propanediol-1,3 and heating the resulting mixture to boiling under reflux until hydrolysis of the nitric acid ester groups is substantially completed.

3. In a process of producing chloramphenicol, the step consisting in treating the methanolic solution of the di-nitric acid ester of D(-)-threo-1-(p-nitro phenyl)-2-dichloro acetylamido propanediol-1,3 with an aqueous solution of ferrous ammonium sulfate, until hydrolysis of the nitric acid ester groups is substantially completed.

References Cited in the file of this patent

UNITED STATES PATENTS

| 2,734,073 | Frevel et al. | Feb. 7, 1956 |
| 2,745,876 | Monroe | May 15, 1956 |
| 2,820,052 | Heywood | Jan. 14, 1958 |

FOREIGN PATENTS

| 498,308 | Belgium | Oct. 14, 1950 |
| 505,352 | Belgium | Sept. 15, 1951 |
| 882,550 | Germany | July 9, 1953 |

OTHER REFERENCES

Werner: J. Chem. Soc. (London), vol. 111 (1917), pp. 863–76.

Lachman: JACS, vol. 43 (1921), pp. 2084–91.